(12) United States Patent
Al-Ugla (10) Patent No.: US 11,131,482 B1
(45) Date of Patent: Sep. 28, 2021

(54) MANAGING POWER USAGE IN AN INDUSTRIAL PROCESS

(71) Applicant: Saudi Arabian Oil Company, Dhahran (SA)

(72) Inventor: Ali Abdulaziz Al-Ugla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/989,236

(22) Filed: Aug. 10, 2020

(51) Int. Cl.
| | |
|---|---|
| *F24S 10/30* | (2018.01) |
| *F02C 1/06* | (2006.01) |
| *F24S 20/20* | (2018.01) |
| *F24S 20/30* | (2018.01) |
| *F01K 23/10* | (2006.01) |
| *F24S 60/10* | (2018.01) |

(52) U.S. Cl.
CPC ............. *F24S 10/30* (2018.05); *F01K 23/10* (2013.01); *F02C 1/06* (2013.01); *F24S 20/20* (2018.05); *F24S 20/30* (2018.05); *F24S 60/10* (2018.05)

(58) Field of Classification Search
CPC .. F24S 10/30; F24S 20/30; F24S 20/20; F24S 60/10; F01K 23/10; F02C 1/06
USPC .............. 60/641.8–641.15, 655, 39.182, 698
See application file for complete search history.

(56) References Cited

U.S. PATENT DOCUMENTS

| | | | |
|---|---|---|---|
| 4,055,948 A * | 11/1977 | Kraus | F24S 80/20 60/641.8 |
| 8,544,526 B2 | 10/2013 | Sudau et al. | |
| 9,488,394 B1 | 11/2016 | El-Shaarawi et al. | |
| 9,702,597 B1 | 7/2017 | El-Shaarawi et al. | |
| 9,784,484 B2 | 10/2017 | El-Shaarawi et al. | |
| 9,835,361 B2 | 12/2017 | El-Shaarawi et al. | |
| 10,041,707 B2 | 8/2018 | El-Shaarawi et al. | |
| 10,634,399 B2 | 4/2020 | El-Shaarawi et al. | |
| 10,634,400 B2 | 4/2020 | El-Shaarawi et al. | |
| 2007/0084208 A1* | 4/2007 | Goldman | F03G 6/067 60/698 |

(Continued)

FOREIGN PATENT DOCUMENTS

| | | |
|---|---|---|
| DE | 102011090094 | 7/2013 |
| EP | 2941475 | 6/2019 |
| JP | 2012083025 | 4/2012 |

OTHER PUBLICATIONS

McBrien et al., "Potential for energy savings by heat recovery in an integrated steel supply chain." Applied Thermal Engineering 103, 592-606, 2016, 15 pages.

*Primary Examiner* — Hoang M Nguyen
(74) *Attorney, Agent, or Firm* — Fish & Richardson P.C.

(57) ABSTRACT

A power system includes a first solar power assembly that includes a first working fluid fluidly coupled to one or more components of an industrial process; a second solar power assembly that includes a second working fluid fluidly coupled to an electrical power generation system that is electrically coupled to the one or more components of the industrial process; and a heat recovery system that includes a heat exchanger. The heat exchanger includes an inlet fluidly coupled to at least one of the one or more components of the industrial process to receive waste heat from the at least one of the one or more components of the industrial process, and an outlet fluidly coupled to at least another of the one or more components of the industrial process to supply the waste heat to the at least another of the one or more components of the industrial process.

24 Claims, 3 Drawing Sheets

(56) References Cited

U.S. PATENT DOCUMENTS

| | | | |
|---|---|---|---|
| 2012/0240577 A1* | 9/2012 | Mandelberg | F24S 10/30 60/641.15 |
| 2013/0014508 A1* | 1/2013 | Brooks | F24S 20/20 60/641.14 |
| 2013/0207402 A1* | 8/2013 | Bronicki | F03G 6/064 290/1 R |
| 2019/0323384 A1 | 10/2019 | Uechi et al. | |

* cited by examiner

MANAGING POWER USAGE IN AN INDUSTRIAL PROCESS

TECHNICAL FIELD

This disclosure relates to systems and methods for managing power usage in an industrial process and, more particularly, systems and methods for optimizing power usage in an industrial process with one or more off-grid power sources.

BACKGROUND

Electrical power needed to operate industrial processes, such as steel mills, iron works, or other metal working and production plants, can be significant. Such electrical power is conventionally provided to the industrial processes through a power distribution and transmission grid that is electrically coupled to the industrial processes. In many instances, one or more power generation sources that supply the electrical power to the distribution and transmission grid also generate carbon emissions, as well as other gaseous output.

SUMMARY

This disclosure describes implementations of a power system that is part of or integrated with an industrial process, such as a steel mill process or other process that utilizes thermal and electrical energy. In some aspects, the power system includes one or more solar power sub-systems that can generate thermal energy (and in some cases, electrical power) for use in the industrial process. In some aspects, the power system also includes a heat recovery sub-system that receives waste heat from the industrial process and uses the waste heat to generate thermal or electrical energy (or both) for the industrial process.

In an example implementation, a power system includes a first solar power assembly that includes a first working fluid fluidly coupled to one or more components of an industrial process, the first solar power assembly configured to heat the first working fluid with solar energy; a second solar power assembly that includes a second working fluid fluidly coupled to an electrical power generation system that is electrically coupled to the one or more components of the industrial process, the second solar power assembly configured to heat the second working fluid with solar energy; and a heat recovery system that includes a heat exchanger. The heat exchanger includes an inlet fluidly coupled to at least one of the one or more components of the industrial process to receive waste heat from the at least one of the one or more components of the industrial process, and an outlet fluidly coupled to at least another of the one or more components of the industrial process to supply the waste heat to the at least another of the one or more components of the industrial process.

In an aspect combinable with the example implementation, the first solar power assembly includes a first plurality of heliostat solar collectors thermally coupled to the first working fluid; a first solar energy receiver positioned to receive the solar energy from the first plurality of heliostat solar collectors; a daytime-open supply valve fluidly coupled between the first solar energy receiver and the industrial process, the daytime-open supply valve configured to control a flow of the first working fluid from the first solar power assembly to the one or more components of the industrial process; and a daytime-open return valve fluidly coupled between the first solar energy receiver and the industrial process, the daytime-open return valve configured to control the flow of the first working fluid from the one or more components of the industrial process to the first solar power assembly.

In another aspect combinable with any of the previous aspects, the second solar power assembly includes a second plurality of heliostat solar collectors thermally coupled to the second working fluid; a second solar energy receiver positioned to receive the solar energy from the second plurality of heliostat solar collectors; a daytime-closed supply valve fluidly coupled between the second solar energy receiver and the electrical power generation system, the daytime-closed supply valve configured to control a flow of the second working fluid from the second solar power assembly to the electrical power generation system; and a daytime-closed return valve fluidly coupled between the second solar energy receiver and the electrical power generation system, the daytime-closed return valve configured to control the flow of the second working fluid from the electrical power generation system to the second solar power assembly.

In another aspect combinable with any of the previous aspects, the second solar power assembly further includes a thermal storage assembly fluidly coupled between the second solar power assembly and the electrical power generation system; a daytime-open supply valve fluidly coupled between the second solar energy receiver and the thermal storage assembly, the daytime-open supply valve configured to control a flow of the second working fluid from the second solar power assembly to the thermal storage assembly; and a daytime-open return valve fluidly coupled between the second solar energy receiver and the electrical power generation system, the daytime-open return valve configured to control the flow of the second working fluid from the thermal storage assembly to the second solar power assembly.

In another aspect combinable with any of the previous aspects, the first working fluid includes a lead-bismuth eutectic alloy.

In another aspect combinable with any of the previous aspects, the second working fluid includes a molten salt.

In another aspect combinable with any of the previous aspects, the electrical power generation system is electrically coupled to the one or more components of the industrial process through a daytime-closed transfer switch and to a power distribution and transmission grid.

In another aspect combinable with any of the previous aspects, the one or more components of the industrial process are electrically coupled to the power distribution and transmission grid through an adjustable transfer switch in parallel with the daytime-closed transfer switch.

In another aspect combinable with any of the previous aspects, the heat recovery system further includes a heat recovery assembly thermally coupled to the at least one of the one or more components of the industrial process to receive the waste heat into a first thermal fluid and a second thermal fluid.

In another aspect combinable with any of the previous aspects, the heat recovery assembly is fluidly coupled to the electrical power generation system to provide at least a portion of the waste heat in the first thermal fluid to the electrical power generation system.

In another aspect combinable with any of the previous aspects, the heat recovery system further includes a heat transfer assembly fluidly coupled between the heat recovery assembly and the heat exchanger to provide at least another portion of the waste heat in the second thermal fluid to a working fluid in the heat exchanger that is fluidly coupled to the at least another of the one or more components of the industrial process through the outlet of the heat exchanger.

In another aspect combinable with any of the previous aspects, the industrial process includes a steel mill.

In another aspect combinable with any of the previous aspects, the at least one of the one or more components includes a continuous caster.

In another aspect combinable with any of the previous aspects, the at least another of the one or more components includes at least one of a solar electric arc furnace, a ladle furnace, or a vacuum degasser.

In another example implementation, a method for supplying power to an industrial process includes operating a first solar energy assembly to heat a first working fluid with solar energy; circulating the heated first working fluid from the first solar power assembly to one or more components of an industrial process; providing thermal energy to the one or more components with heat from the first working fluid; operating a second solar energy assembly to heat a second working fluid with solar energy; circulating the heated second working fluid from the second solar power assembly to an electrical power generation system that is electrically coupled to the one or more components of the industrial process; generating electricity, with heat from the second working fluid, by the electrical power generation system; recovering waste heat in a heat exchanger of a heat recovery system from at least one of the one or more components of the industrial process; and supplying at least a portion of the recovered waste heat from the heat exchanger to at least another of the one or more components of the industrial process.

In an aspect combinable with the example implementation, operating a first solar energy assembly to heat a first working fluid with solar energy includes: collecting the solar energy with a first plurality of heliostat solar collectors of the first solar power assembly, and supplying the collected solar energy to a first solar energy receiver of the first solar power assembly.

In another aspect combinable with any of the previous aspects, circulating the heated first working fluid from the first solar power assembly to one or more components of an industrial process includes: operating a daytime-open supply valve fluidly coupled between the first solar energy receiver and the industrial process to control a flow of the first working fluid from the first solar power assembly to the one or more components of the industrial process, and operating a daytime-open return valve fluidly coupled between the first solar energy receiver and the industrial process to control the flow of the first working fluid from the one or more components of the industrial process to the first solar power assembly.

In another aspect combinable with any of the previous aspects, operating a second solar energy assembly to heat a second working fluid with solar energy includes: collecting the solar energy with a second plurality of heliostat solar collectors of the second solar power assembly, and supplying the collected solar energy to a second solar energy receiver of the second solar power assembly.

In another aspect combinable with any of the previous aspects, circulating the heated second working fluid from the second solar power assembly to an electrical power generation system includes: operating a daytime-closed supply valve fluidly coupled between the second solar energy receiver and the electrical power generation system to control a flow of the second working fluid from the second solar power assembly to the electrical power generation system, and operating a daytime-closed return valve fluidly coupled between the second solar energy receiver and the electrical power generation system to control the flow of the second working fluid from the electrical power generation system to the second solar power assembly.

Another aspect combinable with any of the previous aspects further includes operating a daytime-open supply valve to circulate the heated second working fluid between the second solar energy receiver and a thermal storage assembly; operating a daytime-open return valve to circulate the flow of the second working fluid from the thermal storage assembly to the second solar energy receiver; storing the heated second working fluid in the thermal storage assembly; and operating the daytime-closed supply valve fluidly coupled between the second solar energy receiver and the electrical power generation system to circulate the flow of the heated second working fluid from the thermal storage assembly to the electrical power generation system.

In another aspect combinable with any of the previous aspects, the first working fluid includes a lead-bismuth eutectic alloy.

In another aspect combinable with any of the previous aspects, the second working fluid includes a molten salt.

Another aspect combinable with any of the previous aspects further includes operating a daytime-closed transfer switch electrically coupled between the electrical power generation system and the one or more components of the industrial process and to a power distribution and transmission grid; and supplying electrical power from the electrical power generation system, through the daytime-closed transfer switch, to at least one of the one or more components of the industrial process; or the power distribution and transmission grid.

Another aspect combinable with any of the previous aspects further includes operating an adjustable transfer switch electrically coupled to the one or more components of the industrial process in parallel with the daytime-closed transfer switch; and supplying electrical power from the power distribution and transmission grid, through the adjustable transfer switch, to the one or more components of the industrial process (for example, if needed when supplied thermal energy is insufficient to meet required demand).

Another aspect combinable with any of the previous aspects further includes supplying the waste heat from the at least one of the one or more components of the industrial process to a first thermal fluid and a second thermal fluid in a heat recovery assembly of the heat recovery system; circulating the heated first thermal fluid to the electrical power generation system; generating electricity, with heat from the heated first thermal fluid, by the electrical power generation system; circulating the heated second thermal fluid to a heat transfer assembly of the heat recovery system; circulating the heated second thermal fluid from the heat transfer assembly to the heat exchanger; heating a working fluid in the heat exchanger with the heated second thermal fluid; and supplying the heated working fluid from the heat exchanger to the at least another of the one or more components of the industrial process.

In another aspect combinable with any of the previous aspects, the industrial process includes a steel mill.

In another aspect combinable with any of the previous aspects, the at least one of the one or more components includes a continuous caster.

In another aspect combinable with any of the previous aspects, the at least another of the one or more components includes at least one of a solar electric arc furnace, a ladle furnace, or a vacuum degasser.

In another example implementation, a steel mill power system includes a first solar power assembly that includes a first plurality of heliostat solar power collectors and a first solar energy receiver; a first solar power assembly that includes a first plurality of heliostat solar power collectors and a first solar energy receiver; an electrical power generation system that is electrically coupled to one or more components of a steel mill system; a heat recovery system thermally coupled to at least one of the one or more components of the steel mill system; and a control system communicably coupled to the first and second power assemblies and the heat recovery system and configured to perform operations. The operations include controlling a first set of valves to provide a first working fluid heated by the first solar power assembly to the one or more components of the steel mill system to operate the one or more components of the steel mill system, controlling a second set of valves to provide a second working fluid heated by the second solar power assembly to the electrical power generation system to generate electrical power with the electrical power generation system, and controlling a pump to circulate a thermal fluid heated by waste heat from the at least one of the one or more components of the steel mill system from the heat recovery system to at least another of the one or more components of the steel mill system to operate the at least another of the one or more components of the steel mill system.

In an aspect combinable with the example implementation, the control system is configured to perform operations further including determining a time of day.

In another aspect combinable with any one of the previous aspects, the control system is configured to perform operations further including: based on the determined time of day being daytime: controlling the first set of valves to provide the first working fluid heated by the first solar power assembly to the one or more components of the steel mill system to operate the one or more components of the steel mill system, controlling a third set of valves to provide the second working fluid heated by the second solar power assembly to a thermal energy storage from the second solar power assembly, and controlling a transfer switch to provide the generated electrical power from the electrical power generation system to a power distribution and transmission grid.

In another aspect combinable with any one of the previous aspects, the control system is configured to perform operations further including based on the determined time of day being nighttime: controlling the transfer switch to provide the generated electrical power from the electrical power generation system to the one or more components of the steel mill system, and controlling the pump to circulate the thermal fluid heated by waste heat from the at least one of the one or more components of the steel mill system from the heat recovery system to the at least another of the one or more components of the steel mill system.

In another aspect combinable with any one of the previous aspects, the control system is configured to perform operation further including determining an amount of available power from the electrical power generation system; and based on the determined amount of available power being less than a threshold amount, controlling another transfer switch to provide electrical power from the power distribution and transmission grid to the one or more components of the steel mill system.

In another aspect combinable with any one of the previous aspects, the control system is configured to perform operation further including based on the determined amount of available power being more than the threshold amount and the determined time of day being daytime, controlling the pump to circulate the thermal fluid heated by waste heat from the at least one of the one or more components of the steel mill system from the heat recovery system to the at least another of the one or more components of the steel mill system.

In another aspect combinable with any one of the previous aspects, the control system is configured to perform operation further including, based on the determined amount of available power being more than the threshold amount and the determined time of day being nighttime, controlling the pump to circulate the thermal fluid heated by waste heat from the at least one of the one or more components of the steel mill system from the heat recovery system to the at least another of the one or more components of the steel mill system, controlling the second set of valves to provide the second working fluid heated by the second solar power assembly from the thermal energy storage to the electrical power generation system to generate electrical power, and controlling the transfer switch to provide the generated electrical power from the electrical power generation system to the one or more components of the steel mill system.

Implementations of a power system according to the present disclosure may include one or more of the following features. For example, a power system according to the present disclosure provides for electrical energy savings in an industrial process, such as a steel mill process. As another example, a power system according to the present disclosure provides for a reduction in carbon emissions from an industrial process. As another example, a power system according to the present disclosure reduces an operational cost of an industrial process and provide power (for example, electrical, thermal, or both) on a 24 hour basis to the industrial process without interruption. Also, a power system according to the present disclosure allows for full operation of an industrial process even during maintenance. Further, a power system according to the present disclosure provides for automated control of energy supply management for an industrial process.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
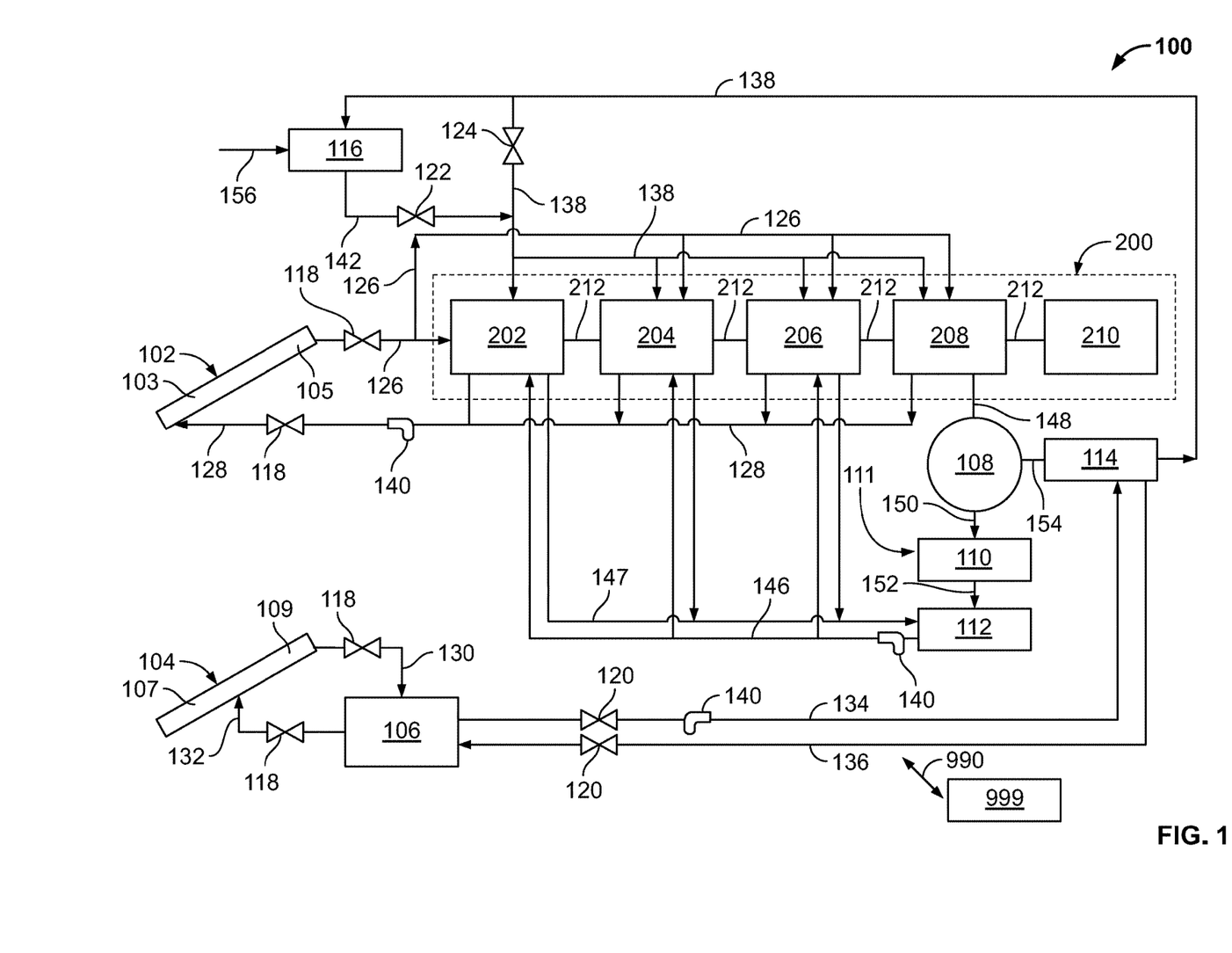
FIG. 1 is a schematic diagram of an example implementation of a power system for an industrial process according to the present disclosure.

FIG. 1 is a schematic diagram of an example implementation of power system 100 for an industrial process 200 according to the present disclosure. In this example implementation, the power system 100 is integrated with one or more components of the industrial process 200 in order to save a total required amount of electrical and thermal energy consumption of the industrial process 200. In this example implementation, the industrial process 200 may be a steel mill, which utilizes large amounts of both thermal energy and electrical energy and produces a massive amount of carbon emissions. Other example implementations may integrate the power system 100 with another type of industrial process that utilizes thermal and electrical energy. The power system 100, however, may provide for savings of electricity consumption in a steel mill industrial process through the integration shown in FIG. 1. The integration of the power system 100 and industrial process 200, as explained in detail in the present disclosure, may include the integration of solar thermal energy with at least two solar power assemblies, a dual heat recovery system integrated with a thermal storage, and an electrical power generation system integrated with the dual heat recovery system. The integration of such sub-systems in power system 100 may effectively reduce energy consumption of the industrial process 200 while also supplying excess electric energy to a power distribution and transmission grid ("power grid").

In the example implementation of FIG. 1, the power system 100 includes a solar power assembly 102 (a "first solar power assembly"), a solar power assembly 104 (a "second solar power assembly"), a heat recovery system 111, and an electrical power generation system 114, each of which is integrated (thermally, electrically, or both) with the industrial process 200. In this example, the industrial process 200 is or includes a steel mill industrial process, which includes a solar electric arc furnace 202, a ladle furnace 204, a vacuum degasser 206, a continuous caster 208, and a final processing unit 210. These components of the steel mill industrial process 200 (in other words, components 202 through 210) operate in concert to work on a material 212 (steel, iron, or other metal) to produce a finished metal product. For instance, the solar electric arc furnace 202 utilizes thermal energy and electric energy to expose material 212 (such as direct reduced iron (DRI) and scrap steel) to an electric arc and melt the material 212. The ladle furnace 204 is used to raise the temperature and adjust the chemical composition of the material 212 (as a molten metal). The vacuum degasser 206, generally, is used to remove certain gasses, such as hydrogen and nitrogen, from the molten material 212. The continuous caster 208 is used to solidify the molten material 212 into a semi-finished billet, bloom, or slab for subsequent rolling in the final processing unit 210. Each of the components 202-210 utilizes thermal energy and electric energy and, in some cases, produces waste heat.

As shown in this example, the first solar power assembly 102 is thermally coupled to components 202-208 by a supply working fluid 126 that operates to transfer thermal energy (for example, heat) produced by the first solar power assembly 102 to the components 202-208 of the industrial process 200 and return to the first solar power assembly 102 as a return working fluid 128. In this example, the first solar power assembly 102 comprises a solar thermal energy system that includes one or more heliostat collectors 103 and a solar energy receiver 105. Generally, the one or more heliostat collectors 103 operate to collect solar energy from the Sun (for example, by tracking the Sun's movement in a daytime period) and focusing the collected solar energy on the solar energy receiver 105. The return working fluid 128 is heated by the solar energy receiver 105 to add thermal energy to produce the supply working fluid 126. In this example, a pump 140 (which may represent one or more pumps) is positioned to circulate the return working fluid 128 to the first solar power assembly 102 from the one or more components 202-208, as well as to circulate the supply working fluid 126 from the first solar power assembly 102 to the one or more components 202-208. In some aspects, the working fluid 126/128 may be a lead-bismuth eutectic (LBE) working fluid that provides a wide range of temperatures for operation that can reach up to 1500° C.

As shown in this example, valves 118 are positioned to control a flow of both of the supply working fluid 126 (heated by the first solar power assembly 102) and the return working fluid 128 (which has provided heat to the components 202-208). In this example, and as explained more fully later, each of the valves 118 are normally-open in the daytime valves. Thus, in this example, during a daytime period, each of valves 118 is open to allow circulation of the supply working fluid 126 and the return working fluid 128 to supply thermal energy from the first solar power assembly 102 to the one or more components 202-208. In some aspects, a daytime period may be defined as a period of time from sunrise to sunset, regardless of receipt of solar energy at the first solar power assembly 102. In some aspects, a daytime period may be defined as a period of time from sunrise to sunset in which sufficient solar energy is received at the first solar power assembly 102 to produce a desired amount of thermal energy (for example, a desired temperature of supply working fluid 126). Thus, as normally-open in the daytime valves, valves 118 may be normally-closed in the nighttime period. In some aspects, a nighttime period may be defined as a period of time from sunset to sunrise. In some aspects, a nighttime period may be defined as a period of time from sunrise to sunset in which insufficient solar energy is received at the first solar power assembly 102 to produce a desired amount of thermal energy (for example, a desired temperature of supply working fluid 126).

As shown in this example, the second solar power assembly 104 is thermally coupled to the electrical power generation system 114 through a thermal storage 106. As shown, the thermal storage 106 (for example, a tank or other form of enclosure that can hold a thermal fluid, such as water, glycol, molten salt, or other fluid in liquid, gas, or mixed-phase state) is fluidly and thermally coupled to the electrical power generation system 114 by a supply thermal fluid 134 that operates to transfer thermal energy (for example, heat) produced by the second solar power assembly 104 from the thermal storage 106 to the electrical power generation system 114 and return to the thermal storage 106 as a return thermal fluid 136.

In this example, the second solar power assembly 104 comprises a solar thermal energy system that includes one or more heliostat collectors 107 and a solar energy receiver 109. Generally, the one or more heliostat collectors 103 operate to collect solar energy from the Sun (for example, by tracking the Sun's movement in a daytime period) and focusing the collected solar energy on the solar energy receiver 109. A return working fluid 132 is heated by the solar energy receiver 109 to add thermal energy to produce a supply working fluid 130, which is supplied to and stored in the thermal storage 106 in this example. In this example, a pump 140 (which may represent one or more pumps) is positioned to circulate the supply thermal fluid 134 to the electrical power generation system 114 from the thermal storage 106, as well as to circulate the return thermal fluid 136 from the electrical power generation system 114 to the thermal storage 106. Another pump (not shown) may also be positioned to circulate the return working fluid 132 to the second solar power assembly 104 from the thermal storage 106, as well as to circulate the supply working fluid 130 from the second solar power assembly 104 to the thermal storage 106. In some aspects, the thermal and working fluids (134/136 and 130/132) may be fluidly coupled (in other words, mixed) within the thermal storage 106. In some aspects, the thermal and working fluids (134/136 and 130/132) may comprise a molten salt with temperature of 550° C. and high heat capacity.

As shown in this example, valves 118 are positioned to control a flow of both of the supply working fluid 130 (heated by the second solar power assembly 104) and the return working fluid 132 between the second solar power assembly 104 and the thermal storage 106. In this example, each of the valves 118 are normally-open in the daytime valves, similar to valves 118 as explained with reference to the first solar power assembly 102. Further as shown, valves 120 are positioned to control a flow of both of the supply thermal fluid 134 (from the thermal storage to the electrical power generation system 114) and the return thermal fluid 136 (from the electrical power generation system 114 to the thermal storage 106). In this example, and as explained more fully later, each of the valves 120 are normally-closed in the daytime valves. Thus, in this example, during a daytime period, each of valves 120 is closed to prevent circulation of the supply thermal fluid 134 and the return thermal fluid 136 between the thermal storage 106 and the electrical power generation system 114. As noted, the nighttime period may be defined as the period of time from sunset to sunrise. In some aspects, the nighttime period may be defined as the period of time from sunrise to sunset in which insufficient solar energy is received at the second solar power assembly 104 to produce a desired amount of thermal energy (for example, a desired temperature of supply working fluid 130 and/or supply thermal fluid 134). Thus, as normally-closed in the daytime valves, valves 120 may be normally-open in the nighttime period to facilitate the transfer of thermal energy (within the supply thermal fluid 134) from the thermal storage 106 to the electrical power generation system 114.

In this example, the electrical power generation system 114 may utilize thermal energy (such as from the supply thermal fluid 134 and thermal energy from the heat recovery system 111 as explained later) to generate electrical power 138 (in other words, electrical current at a particular voltage). For example, the electrical power generation system 114 may include one or more evaporators, turbines, condensers, and generators (as well as associated pumps, valves, sensors, piping, etc.) to produce electrical power from the generators that are driven by a vaporized working fluid circulated through the turbines. The working fluid in the electrical power generation system 114 may, for example, be vaporized by thermal heat supplied by one or both of the supply thermal fluid 134 or the heat recovery system 111 and later condensed in the condensers.

As shown in the example implementation of power system 100, the heat recovery system 111 is thermally coupled to one or more components 202-210 of the industrial process 200 that produce waste heat; in this example, the heat recovery system 111 is shown as thermally coupled to received waste heat 148 from the continuous caster 208. In this example implementation, the heat recovery system 111 includes a heat recovery assembly 108, a thermal energy transfer assembly 110, and one or more heat exchangers 112. The heat recovery assembly 108 includes, for example, one or more control valves, piping, and possibly one or more pumps that are operable to recover the waste heat 148 supplied by the continuous caster 208 into a working fluid of the heat recovery system 111. As shown in this example, the thermal energy from the waste heat 148 that is transferred to the working fluid may be provided (selectively) as a thermal fluid 154 to the electrical power generation system 114 or as a thermal fluid 150 to the thermal energy transfer assembly 110. As noted previously, the thermal fluid 154 provided to the electrical power generation system 114 may be used to vaporize (or otherwise transfer heat to) the working fluid of the electrical power generation system 114 that is used to generate electrical power 138.

The thermal energy transfer assembly 110, in this example, receives the thermal fluid 150 from the heat recovery assembly 108 and circulates or otherwise transfers thermal energy 152 to the heat exchanger 112. In this example, the thermal energy transfer assembly 110 includes one or more control valves, piping, and possibly one or more pumps that circulate the thermal fluid 150 (and associated thermal energy 152) to the heat exchanger 112 in which the thermal energy 152 is transferred to a supply thermal fluid 146. As shown in this example, the supply thermal fluid 146 (heated by the thermal energy 152) is circulated (by one or more pumps 140) to one or more components 202-206 of the industrial process 200. Thus, in this example, the supply thermal fluid 146 may be a secondary or otherwise additional source of thermal energy supplied to the industrial process 200 with the supply working fluid 126. A return thermal fluid 147 (after transferring heat to the one or more components 202-206) is circulated (for example, by pump 140) back to the heat exchanger 112.

As shown in this example, the power grid 116 is electrically coupled to one or more components of the industrial process 200. The power grid 116 receives and facilitates transfer of electrical power 156 from on-grid sources, such as coal plants, nuclear power plants, natural gas plants, or other power sources that directly supply electrical power to the grid 116. In this example, the electrical power 138 generated by the electrical power generation system 114 is electrically coupled in parallel to the power grid 116 and a normally-closed in daytime transfer switch 124. Thus, in this example, during a daytime period, the transfer switch 124 is closed to prevent electrical power 138 from flowing to the one or more components 202-208. When the transfer switch 124 is closed during a daytime period, the electrical power 138 is supplied to the power grid 116. Thus, as normally-closed in the daytime transfer switch, switch 124 may be normally-open in the nighttime period. When open, the transfer switch 124 facilitates the supply of the electrical power 138 from the electrical power generation system 114 to the one or more components 202-208 of the industrial process 200.

Grid electrical power 142 (in other words, electrical power supplied by the power grid 116) is electrically coupled to the one or more components 202-208 in parallel with electrical power 138 through another transfer switch 122. In this example, transfer switch 122 is an adjustable switch that is closed when sufficient power (for example, thermal power, electrical power, or both) is available to the industrial process 200 from the power system 100 and open when sufficient power (for example, thermal power, electrical power, or both) is unavailable to the industrial process 200 from the power system 100. Sufficient power may be unavailable, for example, when insufficient solar energy is available to either or both of the first solar power assembly 102 or the second solar power assembly 104. Further, sufficient power may be unavailable, for example, when insufficient waste heat 148 is available to the heat recovery system 111.

The power system 100, in this example, includes a control system 999 that is communicably coupled with the components of the power system 100 (solar power assemblies, valves, pumps, transfer switches, sensors, and other components) to provide and receive commands/data 990 (wirelessly or by wired connections). The control system 999 can include a computer-readable medium storing instructions (such as flow control instructions and other instructions) executable by one or more processors to perform operations (such as flow control operations). For example, data 990, in the form of sensed values of pressure, temperature, current, voltage, solar intensity, and other data) may be received by the control system 999 and processed to generate one or more commands 990 back to the components of the power system 100 to operate or control such components. In some aspects, one or more operations performed by the components of the power system 100 may be based on commands 990 received from the control system 999.

The example implementation described includes process streams (for example, process liquid, gasses, or mixed-phase fluids) in the form of working and thermal fluids within the power system 100 integrated with the industrial process 200. The process streams can be circulated using one or more flow control systems implemented throughout the system 100. A flow control system can include one or more flow pumps (such as pumps 140 or other pumps) to pump the process fluids, one or more flow conduits through which the process streams are flowed, and one or more valves (such as valves 118, valves 120, and other valves) to regulate the flow of fluids through the conduits. A flow control system can also include one or more electrical circuits to transfer electrical power (for example, current at a particular voltage) between components of the power system 100 and one or more transfer switches (such as transfer switches 122 and 124, and other switches) to regulate the flow of electrical power through the circuits.

In some implementations, a flow control system can be operated manually. For example, an operator can set a flow rate for each pump and set valve open or close positions to regulate the flow of the process streams through the conduits in the flow control system. Once the operator has set the flow rates and the valve open or close positions for all flow control systems distributed across the system for providing power (for example, electrical power and thermal power), the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically, such as by the control system 999 through control signals 990. For example, the flow control system can be connected to a computer or control system (control system 999) to operate the flow control system. An operator can set the flow rates and the valve open or close positions for all flow control systems distributed across the facility using the control system. In such implementations, the operator can manually change the flow conditions by providing inputs through the control system. Also, in such implementations, the control system can automatically (that is, without manual intervention) control one or more of the flow control systems, for example, using feedback systems connected to the control system. For example, a sensor (such as a pressure sensor, temperature sensor, time of day, or other sensor) (not specifically shown) can be connected to a conduit through which a process stream flows. The sensor can monitor and provide a flow condition (such as a pressure, temperature, time of day, or other flow condition) of the process stream to the control system. In response to the flow condition exceeding a threshold (such as a threshold pressure value, a threshold temperature value, or other threshold value), the control system can automatically perform operations. For example, if the pressure or temperature in the conduit exceeds the threshold pressure value or the threshold temperature value, respectively, the control system can provide a signal to the pump to decrease a flow rate, a signal to open a valve to relieve the pressure, a signal to shut down process stream flow, or other signals.

Figure 2:
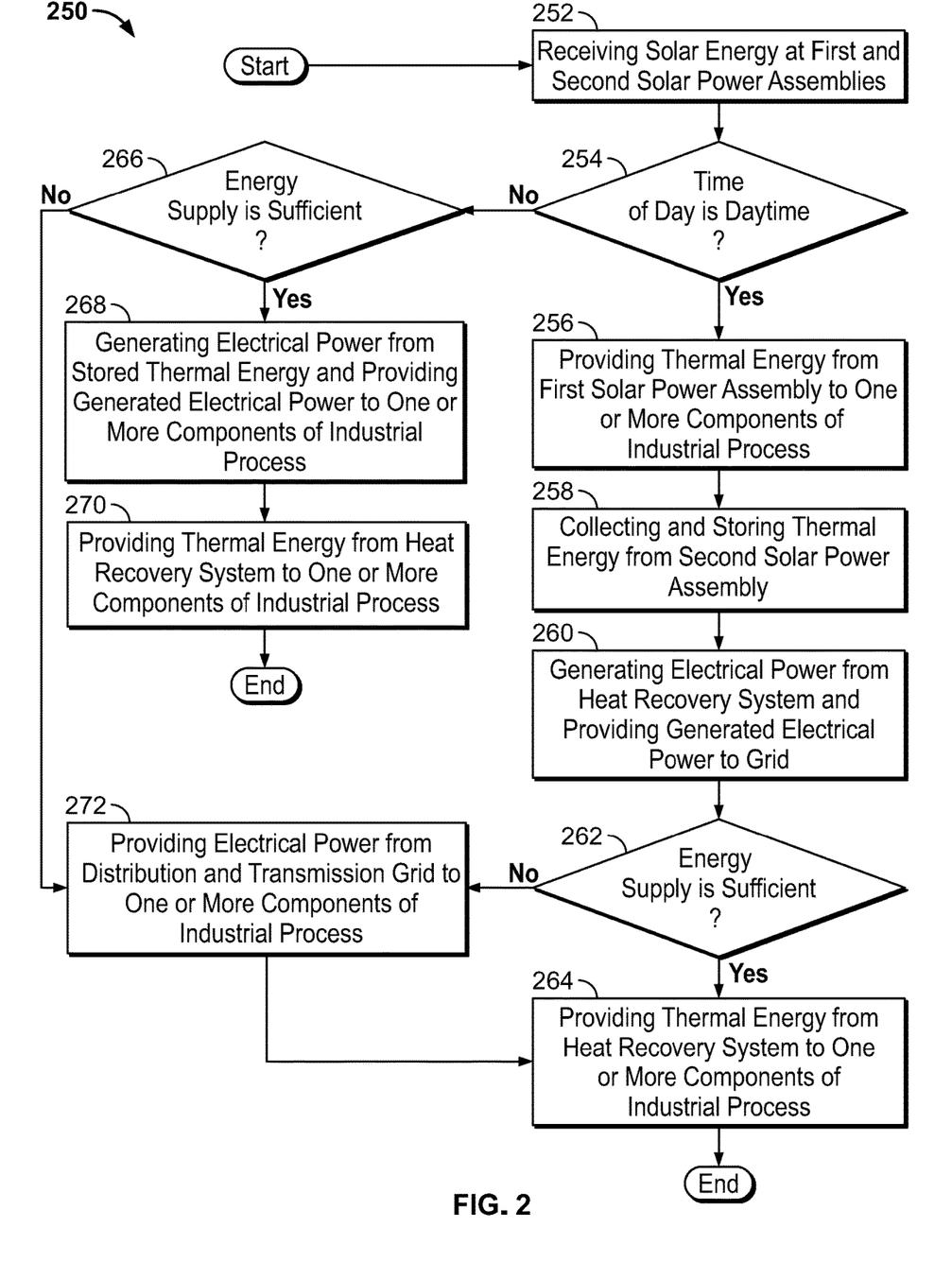
FIG. 2 illustrates a flowchart of an example method of operation of a power system for an industrial process according to the present disclosure.

FIG. 2 illustrates a flowchart of an example method 250 of operation of a power system for an industrial process according to the present disclosure. In some aspects, the method 250 may describe an example operation of the power system 100 performed with the components described previously with reference to FIG. 1, including the control system 999. For example, method 250 may start and begin at step 252, which includes receiving solar energy at first and second solar power assemblies. For example, as shown in power system 100, the first and second solar power assemblies 102/104 receive solar energy at heliostat collectors 103 and 107, respectively, and focus such collected solar energy on the solar energy receivers 105 and 109, respectively. The solar energy collectors 105 and 107 transfer the solar energy (in the form of heat) to the return working fluid 128 and return working fluid 132, respectively, to provide heated supply working fluid 126 and heated supply working fluid 130, respectively.

Method 250 may continue at step 254, which includes a determination of whether the time of day is daytime. For example, if a time of day is between sunrise and sunset, or a time of day is between sunrise and sunset and sufficient solar energy is available from the Sun, the determination in step 254 is yes. If a time of day is between sunset and sunrise, or a time of day is between sunrise and sunset and sufficient solar energy is unavailable from the Sun, the determination in step 254 is no. In some aspects, the control system 999 may make the determination in step 254 based on, for example, the time of day or measured solar intensity from the Sun (or both).

If the determination of step 254 is yes, method 250 may continue at step 256, which includes providing thermal energy from first solar power assembly to one or more components of industrial process. For example, as shown in FIG. 1, the first solar power assembly 102 heats the supply working fluid 126, which is circulated (for example, by pump 140) through valve 118 to the components 202-208 of the industrial process 200. In some aspects, the supply working fluid 126 is heated up to about 1500° C. (for example, as the lead-bismuth eutectic) and supplied to the components 202-208. In some aspects, step 254 or step 256 includes operating the valves 118 that are fluidly coupled to the first solar power assembly 102 in order to allow circulation of the supply working fluid 126 and return working fluid 128 there through. For example, as normally-open in daytime valves, the valves 118 may be closed during nighttime, and the determination in step 254 that the time of day is daytime may initiate opening of the valves 118 (for example, by the control system 999).

Method 250 may continue at step 258, which includes collecting and storing thermal energy from second solar power assembly. For example, the second solar power assembly 104 heats the supply working fluid 130, which is circulated (for example, by one or more pumps) to the thermal storage 106. In some aspects, return working fluid 132 is circulated from the thermal storage 106 for heating by the second solar power assembly 104 until, for instance, all of the working fluid stored within the thermal storage 106 reaches a particular thermal energy (for example, a particular temperature). In some aspects, once the working fluid in the thermal storage 106 reaches a particular temperature or capacity, the thermal storage 106 is sealed.

In some aspects, step 254 or step 258 includes operating the valves 118 that are fluidly coupled between the second solar power assembly 104 and the thermal storage 106 in order to allow circulation of the supply working fluid 130 and return working fluid 132 there through. For example, as normally-open in daytime valves, the valves 118 may be closed during nighttime, and the determination in step 254 that the time of day is daytime may initiate opening of the valves 118 (for example, by the control system 999).

Method 250 may continue at step 260, which includes generating electrical power from heat recovery system and providing generated electrical power to grid. For example, during operation of the industrial process 200 (for example, during the execution of method 250 as a full time operation), waste heat 148 is received at the heat recovery system 111 (for example, at the heat recovery assembly 108). The waste heat 148 is transferred or otherwise provided to the thermal fluid 154 that is provided to the electrical power generation system 114. The thermal fluid 154 is used to vaporize or otherwise heat a working fluid in the electrical power generation system 114 to produce electrical power 138. The generated electrical power 138 is provided back to the power grid 116, as the normally-closed in daytime transfer switch 124 is closed after the determination of yes in step 254 (for example, by the control system 999, if not already closed). In some aspects, electrical power generation system 114 may also utilize thermal energy from the thermal storage 106 to generate electrical power 138 in step 260. In some aspects, the electrical power 138 may be provided to both the power grid 116 and the one or more components 202-208 (through an opened transfer switch 124) at the same time (and, for example, during the daytime).

Thus, in a daytime time period, thermal energy is supplied from solar power assemblies 102 and 104 and electrical energy is supplied through the heat recovery system 111 and thermal storage 106 (through electrical power generation system 114). The transfer switch 124 may be open in daytime only if there insufficient energy supply from the components 102, 104, 106, and 108 and there is insufficient electrical supply from power grid 116.

Method 250 may continue at step 262, which includes a determination of whether an energy supply is sufficient. For example, in some aspects, an amount of energy (for example, thermal energy, electrical energy, or both) is monitored and determined by the control system 999. For example, a temperature of the working fluid in the thermal storage 106 may be monitored and determined to determine an amount of stored thermal energy. Also, an amount of the electrical power 138 may be measured (for example, in real-time, or at certain time instants). As another example, an amount and/or temperature of waste heat 148 is measured to determine an amount of thermal energy provided to the heat recovery system 111.

If the determination at step 262 is yes, method 250 may continue at step 264, which includes providing thermal energy from the heat recovery system to one or more components of industrial process. For example, the thermal fluid 146 may be heated in the heat exchanger 112 by heat taken from the waste heat 149 from the continuous caster 208 (in this example). In alternative examples, waste heat 148 may be recovered from the continuous caster 208 as well as one or more other components 202-206. In alternative examples, waste heat 148 may be recovered from one or more of the components 202-206 but not the continuous caster 208. The heated thermal fluid 146 is circulated (by pump 140) to the components 202-206 to provide thermal energy for operation of such components. Method 250 may end after step 264 (and be repeated, as necessary).

Returning to step 254, if the determination at step 254 is no, then method 250 may continue at step 266, which includes a determination of whether an energy supply is sufficient. For example, in step 254, a "no" determination indicates that the time of day is nighttime (for example, a time between sunset and sunrise). And as previously described, an amount of energy (for example, thermal energy, electrical energy, or both) may be monitored and determined by the control system 999. For example, a temperature of the working fluid in the thermal storage 106 may be monitored and determined to determine an amount of stored thermal energy. Also, an amount of the electrical power 138 may be measured (for example, in real-time, or at certain time instants). As another example, an amount and/or temperature of waste heat 148 is measured to determine an amount of thermal energy provided to the heat recovery system 111. In some aspects, step 266 may also include operating the valves 120 to open (from their normally-closed in daytime state). Step 266 may also include operating the transfer switch 124 to open (from its their normally-closed in daytime state).

If the determination at step 266 is yes, then method 250 may continue at step 268, which includes generating electrical power from stored thermal energy and providing the generated electrical power to one or more components of industrial process. For example, the supply thermal fluid 134 may be circulated (for example, by the pump 140) from the thermal storage 106 to the electrical power generation system 114. Thermal fluid 134 may vaporize or otherwise heat a working fluid in the electrical power generation system 114 to drive one or more turbines to generate the electrical power 138. The electrical power 138 may be provided (through open transfer switch 124) to the components 202-208 of the industrial process 200. In some aspects, such as depending on how much electrical power is required by the components 202-208, the electrical power 138 may be provided both to the power grid 116 and the one or more components 202-208 during nighttime operation of the industrial process 200.

Method 250 may continue at step 270, which includes providing thermal energy from the heat recovery system to one or more components of the industrial process. For example, during nighttime operation when the first solar power assembly 102 may not provide sufficient thermal energy (due to insufficient solar energy), the thermal fluid 146 may be heated in the heat exchanger 112 by heat taken from the waste heat 149 from the continuous caster 208 (in this example). In alternative examples, waste heat 148 may be recovered from the continuous caster 208 as well as one or more other components 202-206. In alternative examples, waste heat 148 may be recovered from one or more of the components 202-206 but not the continuous caster 208. The heated thermal fluid 146 is circulated (by pump 140) to the components 202-206 to provide thermal energy for operation of such components. Method 250 may end after step 270 (and be repeated, as necessary).

Returning to steps 266 or 262, if the determination in either of steps 266 or 262 is no, then method 250 may continue at step 272, which includes providing electrical power from distribution and transmission grid to one or more components of industrial process. For example, in a situation (daytime or nighttime) when sufficient energy (thermal, electrical or both) is insufficient to meet the energy requirements of the industrial process 200, the power grid 116 may supply electrical power 142 (through the transfer switch 122) to the one or more components 202-208 of the industrial process 200. In some aspects, step 272 includes operating the transfer switch 122 (for example, by control system 999) to open the switch 122.

Method 250 may continue at step 264, which includes providing thermal energy from the heat recovery system to one or more components of the industrial process (as described previously with respect to step 264). Method 250 may end after step 264 (and be repeated, as necessary).

Figure 3:
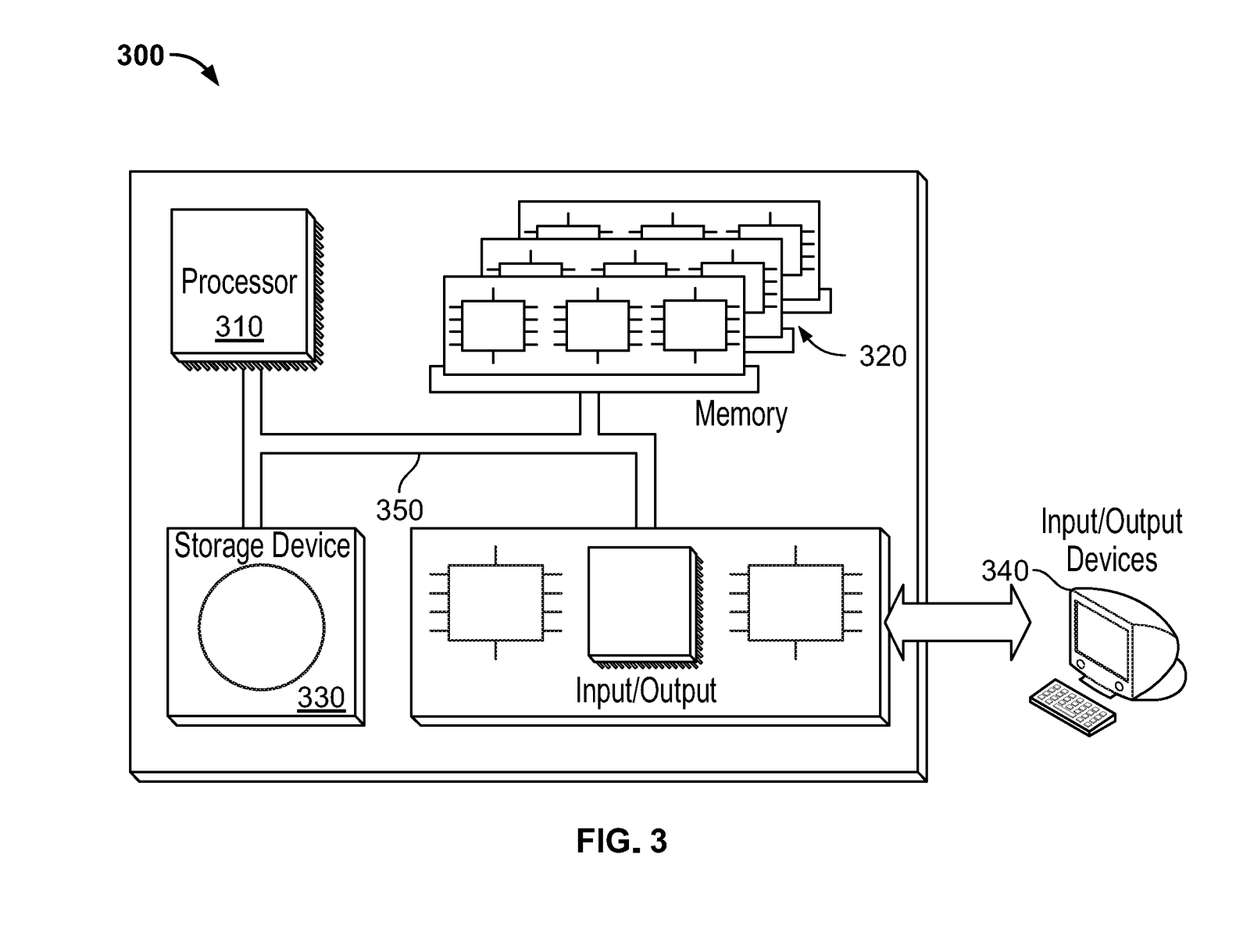
FIG. 3 is a schematic illustration of an example controller (or control system) for controlling operations of a power system for an industrial process according to the present disclosure.

FIG. 3 is a schematic illustration of an example controller 300 (or control system) for controlling operations of a power system for an industrial process according to the present disclosure. For example, the controller 300 may include or be part of the control system 999 shown in FIG. 1. The controller 300 is intended to include various forms of digital computers, such as printed circuit boards (PCB), processors, digital circuitry, or otherwise parts of a power system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340 (for displays, input devices, example, sensors, valves, pumps). Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the controller 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, or a tape device.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A power system, comprising:
    a first solar power assembly that comprises a first working fluid fluidly coupled to one or more components of an industrial process, the first solar power assembly configured to heat the first working fluid with solar energy;
    a second solar power assembly that comprises a second working fluid fluidly coupled to an electrical power generation system that is electrically coupled to the one or more components of the industrial process, the second solar power assembly configured to heat the second working fluid with solar energy; and
    a heat recovery system that comprises a heat exchanger, the heat exchanger comprising an inlet fluidly coupled to at least one of the one or more components of the industrial process to receive waste heat from the at least one of the one or more components of the industrial process, and an outlet fluidly coupled to at least another of the one or more components of the industrial process to supply the waste heat to the at least another of the one or more components of the industrial process.

2. The power system of claim 1, wherein the first solar power assembly comprises:
    a first plurality of heliostat solar collectors thermally coupled to the first working fluid;
    a first solar energy receiver positioned to receive the solar energy from the first plurality of heliostat solar collectors;
    a daytime-open supply valve fluidly coupled between the first solar energy receiver and the industrial process, the daytime-open supply valve configured to control a flow of the first working fluid from the first solar power assembly to the one or more components of the industrial process; and
    a daytime-open return valve fluidly coupled between the first solar energy receiver and the industrial process, the daytime-open return valve configured to control the flow of the first working fluid from the one or more components of the industrial process to the first solar power assembly.

3. The power system of claim 2, wherein the second solar power assembly comprises:
    a second plurality of heliostat solar collectors thermally coupled to the second working fluid;
    a second solar energy receiver positioned to receive the solar energy from the second plurality of heliostat solar collectors;
    a daytime-closed supply valve fluidly coupled between the second solar energy receiver and the electrical power generation system, the daytime-closed supply valve configured to control a flow of the second working fluid from the second solar power assembly to the electrical power generation system; and
    a daytime-closed return valve fluidly coupled between the second solar energy receiver and the electrical power generation system, the daytime-closed return valve configured to control the flow of the second working fluid from the electrical power generation system to the second solar power assembly.

4. The power system of claim 3, wherein the second solar power assembly further comprises:
    a thermal storage assembly fluidly coupled between the second solar power assembly and the electrical power generation system;
    a daytime-open supply valve fluidly coupled between the second solar energy receiver and the thermal storage assembly, the daytime-open supply valve configured to control a flow of the second working fluid from the second solar power assembly to the thermal storage assembly; and
    a daytime-open return valve fluidly coupled between the second solar energy receiver and the electrical power generation system, the daytime-open return valve configured to control the flow of the second working fluid from the thermal storage assembly to the second solar power assembly.

5. The power system of claim 4, wherein the first working fluid comprises a lead-bismuth eutectic alloy, and the second working fluid comprises a molten salt.

6. The power system of claim 4, wherein the electrical power generation system is electrically coupled to the one or more components of the industrial process through a daytime-closed transfer switch and to a power distribution and transmission grid.

7. The power system of claim 6, wherein the one or more components of the industrial process are electrically coupled to the power distribution and transmission grid through an adjustable transfer switch in parallel with the daytime-closed transfer switch.

8. The power system of claim 1, wherein the heat recovery system further comprises:
- a heat recovery assembly thermally coupled to the at least one of the one or more components of the industrial process to receive the waste heat into a first thermal fluid and a second thermal fluid, the heat recovery assembly fluidly coupled to the electrical power generation system to provide at least a portion of the waste heat in the first thermal fluid to the electrical power generation system; and
- a heat transfer assembly fluidly coupled between the heat recovery assembly and the heat exchanger to provide at least another portion of the waste heat in the second thermal fluid to a working fluid in the heat exchanger that is fluidly coupled to the at least another of the one or more components of the industrial process through the outlet of the heat exchanger.

9. The power system of claim 1, wherein the industrial process comprises a steel mill, and the at least one of the one or more components comprises a continuous caster, and the at least another of the one or more components comprises at least one of a solar electric arc furnace, a ladle furnace, or a vacuum degasser.

10. A method for supplying power to an industrial process, comprising:
- operating a first solar energy assembly to heat a first working fluid with solar energy;
- circulating the heated first working fluid from the first solar power assembly to one or more components of an industrial process;
- providing thermal energy to the one or more components with heat from the first working fluid;
- operating a second solar energy assembly to heat a second working fluid with solar energy;
- circulating the heated second working fluid from the second solar power assembly to an electrical power generation system that is electrically coupled to the one or more components of the industrial process;
- generating electricity, with heat from the second working fluid, by the electrical power generation system;
- recovering waste heat in a heat exchanger of a heat recovery system from at least one of the one or more components of the industrial process; and
- supplying at least a portion of the recovered waste heat from the heat exchanger to at least another of the one or more components of the industrial process.

11. The method of claim 10, wherein operating a first solar energy assembly to heat a first working fluid with solar energy comprises: collecting the solar energy with a first plurality of heliostat solar collectors of the first solar power assembly, and supplying the collected solar energy to a first solar energy receiver of the first solar power assembly; and
- circulating the heated first working fluid from the first solar power assembly to one or more components of an industrial process comprises: operating a daytime-open supply valve fluidly coupled between the first solar energy receiver and the industrial process to control a flow of the first working fluid from the first solar power assembly to the one or more components of the industrial process, and operating a daytime-open return valve fluidly coupled between the first solar energy receiver and the industrial process to control the flow of the first working fluid from the one or more components of the industrial process to the first solar power assembly.

12. The method of claim 11, wherein operating a second solar energy assembly to heat a second working fluid with solar energy comprises: collecting the solar energy with a second plurality of heliostat solar collectors of the second solar power assembly, and supplying the collected solar energy to a second solar energy receiver of the second solar power assembly; and
- circulating the heated second working fluid from the second solar power assembly to an electrical power generation system comprises: operating a daytime-closed supply valve fluidly coupled between the second solar energy receiver and the electrical power generation system to control a flow of the second working fluid from the second solar power assembly to the electrical power generation system, and operating a daytime-closed return valve fluidly coupled between the second solar energy receiver and the electrical power generation system to control the flow of the second working fluid from the electrical power generation system to the second solar power assembly.

13. The method of claim 12, further comprising:
- operating a daytime-open supply valve to circulate the heated second working fluid between the second solar energy receiver and a thermal storage assembly;
- operating a daytime-open return valve to circulate the flow of the second working fluid from the thermal storage assembly to the second solar energy receiver;
- storing the heated second working fluid in the thermal storage assembly; and
- operating the daytime-closed supply valve fluidly coupled between the second solar energy receiver and the electrical power generation system to circulate the flow of the heated second working fluid from the thermal storage assembly to the electrical power generation system.

14. The method of claim 13, wherein the first working fluid comprises a lead-bismuth eutectic alloy, and the second working fluid comprises a molten salt.

15. The method of claim 13, further comprising:
- operating a daytime-closed transfer switch electrically coupled between the electrical power generation system and the one or more components of the industrial process and to a power distribution and transmission grid; and
- supplying electrical power from the electrical power generation system, through the daytime-closed transfer switch, to at least one of:
  - the one or more components of the industrial process; or
  - the power distribution and transmission grid.

16. The method of claim 15, further comprising:
- operating an adjustable transfer switch electrically coupled to the one or more components of the industrial process in parallel with the daytime-closed transfer switch; and
- supplying electrical power from the power distribution and transmission grid, through the adjustable transfer switch, to the one or more components of the industrial process.

17. The method of claim 10, further comprising:
- supplying the waste heat from the at least one of the one or more components of the industrial process to a first thermal fluid and a second thermal fluid in a heat recovery assembly of the heat recovery system;
- circulating the heated first thermal fluid to the electrical power generation system;
- generating electricity, with heat from the heated first thermal fluid, by the electrical power generation system;

circulating the heated second thermal fluid to a heat transfer assembly of the heat recovery system;

circulating the heated second thermal fluid from the heat transfer assembly to the heat exchanger;

heating a working fluid in the heat exchanger with the heated second thermal fluid; and supplying the heated working fluid from the heat exchanger to the at least another of the one or more components of the industrial process.

18. The method of claim 10, wherein the industrial process comprises a steel mill, and the at least one of the one or more components comprises a continuous caster, and the at least another of the one or more components comprises at least one of a solar electric arc furnace, a ladle furnace, or a vacuum degasser.

19. A steel mill power system, comprising:
a first solar power assembly that comprises a first plurality of heliostat solar power collectors and a first solar energy receiver;
a second solar power assembly that comprises a second plurality of heliostat solar power collectors and a second solar energy receiver;
an electrical power generation system that is electrically coupled to one or more components of a steel mill system;
a heat recovery system thermally coupled to at least one of the one or more components of the steel mill system; and
a control system communicably coupled to the first and second solar power assemblies and the heat recovery system and configured to perform operations comprising:
controlling a first set of valves to provide a first working fluid heated by the first solar power assembly to the one or more components of the steel mill system to operate the one or more components of the steel mill system,
controlling a second set of valves to provide a second working fluid heated by the second solar power assembly to the electrical power generation system to generate electrical power with the electrical power generation system, and
controlling a pump to circulate a thermal fluid heated by waste heat from the at least one of the one or more components of the steel mill system from the heat recovery system to at least another of the one or more components of the steel mill system to operate the at least another of the one or more components of the steel mill system.

20. The steel mill power system of claim 19, wherein the control system is configured to perform operations further comprising:
determining a time of day; and
based on the determined time of day being daytime:
controlling the first set of valves to provide the first working fluid heated by the first solar power assembly to the one or more components of the steel mill system to operate the one or more components of the steel mill system,
controlling a third set of valves to provide the second working fluid heated by the second solar power assembly to a thermal energy storage from the second solar power assembly, and
controlling a transfer switch to provide the generated electrical power from the electrical power generation system to a power distribution and transmission grid.

21. The steel mill power system of claim 20, wherein the control system is configured to perform operations further comprising:
based on the determined time of day being nighttime:
controlling the transfer switch to provide the generated electrical power from the electrical power generation system to the one or more components of the steel mill system, and
controlling the pump to circulate the thermal fluid heated by waste heat from the at least one of the one or more components of the steel mill system from the heat recovery system to the at least another of the one or more components of the steel mill system.

22. The steel mill power system of claim 21, wherein the control system is configured to perform operation further comprising:
determining an amount of available power from the electrical power generation system; and
based on the determined amount of available power being less than a threshold amount, controlling another transfer switch to provide electrical power from the power distribution and transmission grid to the one or more components of the steel mill system.

23. The steel mill power system of claim 21, wherein the control system is configured to perform operation further comprising:
based on the determined amount of available power being more than the threshold amount and the determined time of day being daytime, controlling the pump to circulate the thermal fluid heated by waste heat from the at least one of the one or more components of the steel mill system from the heat recovery system to the at least another of the one or more components of the steel mill system.

24. The steel mill power system of claim 20, wherein the control system is configured to perform operation further comprising:
based on the determined amount of available power being more than the threshold amount and the determined time of day being nighttime:
controlling the pump to circulate the thermal fluid heated by waste heat from the at least one of the one or more components of the steel mill system from the heat recovery system to the at least another of the one or more components of the steel mill system,
controlling the second set of valves to provide the second working fluid heated by the second solar power assembly from the thermal energy storage to the electrical power generation system to generate electrical power, and
controlling the transfer switch to provide the generated electrical power from the electrical power generation system to the one or more components of the steel mill system.

* * * * *